US009261223B2

(12) United States Patent
Ellersiek

(10) Patent No.: US 9,261,223 B2
(45) Date of Patent: Feb. 16, 2016

(54) METHOD OF IMPROVING THE PHYSICAL PROPERTIES IN THE PRODUCTION OF PSPS (PLASTIC-SHEATHED PIPES)

(71) Applicant: BASF SE, Ludwigshafen (DE)

(72) Inventor: Carsten Ellersiek, Lengerich (DE)

(73) Assignee: BASF SE, Ludwigshafen (DE)

( * ) Notice: Subject to any disclaimer, the term of this patent is extended or adjusted under 35 U.S.C. 154(b) by 492 days.

(21) Appl. No.: 13/655,967

(22) Filed: Oct. 19, 2012

(65) Prior Publication Data

US 2013/0098493 A1 Apr. 25, 2013

Related U.S. Application Data

(60) Provisional application No. 61/549,766, filed on Oct. 21, 2011.

(51) Int. Cl.
*B29C 44/12* (2006.01)
*F16L 59/14* (2006.01)

(52) U.S. Cl.
CPC ........... *F16L 59/143* (2013.01); *B29C 44/1242* (2013.01)

(58) Field of Classification Search
CPC ............ B29C 44/1228; B29C 44/1242; B29C 44/1271; B29C 44/1295; B29C 44/18; F16L 59/028; Y10T 29/49428; Y10T 29/4943; Y10T 29/4998; Y10T 29/49982; Y10T 29/49993
See application file for complete search history.

(56) References Cited

U.S. PATENT DOCUMENTS

| 3,949,461 A | 4/1976 | Thastrup |
| 6,010,650 A | 1/2000 | Schmiade |
| 6,284,812 B1 | 9/2001 | Rotermund et al. |
| 2010/0098891 A1* | 4/2010 | Grieser-Schmitz et al. . 428/36.5 |

FOREIGN PATENT DOCUMENTS

| DE | 197 42 012 A1 | 3/1999 |
| DE | 199 38 140 A1 | 3/2001 |
| EP | 0 865 893 A2 | 9/1998 |
| EP | 0 960 723 A2 | 12/1999 |
| EP | 1 552 915 A2 | 7/2005 |
| EP | 1 783 152 A2 | 5/2007 |
| FR | 2 634 157 A1 | 1/1990 |
| GB | 1 291 135 A | 9/1972 |

OTHER PUBLICATIONS

International Search Report and Written Opinion issued Feb. 13, 2013 in PCT/EP2012/070710 with English translation of categories of cited documents.
U.S. Appl. No. 13/920,356, filed Jun. 18, 2013, Grieser-Schmitz, et al.
U.S. Appl. No. 13/684,976, filed Nov. 26, 2012, Ellersiek.
U.S. Appl. No. 13/923,959, filed Jun. 21, 2013, Grieser-Schmitz et al.

* cited by examiner

*Primary Examiner* — Christopher Besler
(74) *Attorney, Agent, or Firm* — Oblon, McClelland, Maier & Neustadt, L.L.P.

(57) ABSTRACT

The present invention relates to a process for producing insulated pipes, which comprises the steps (A) provision of pipe for a medium and outer pipe, where the pipe for a medium is arranged within the outer pipe and an annular gap having ends E1 and E2 is formed between the pipe for a medium and outer pipe, (B) introduction of a polyurethane system comprising at least one isocyanate component (a) and at least one polyol mixture (b) into the annular gap at the end E1 and (C) foaming and curing of the polyurethane system, wherein the annular gap is closed by means of a cap at the end E2 and this cap has openings having an adjustable size, a cap which has openings having an adjustable size, the use of this cap for producing insulated pipes and also an insulated pipe which can be produced by the above-described process of the invention.

8 Claims, No Drawings

METHOD OF IMPROVING THE PHYSICAL PROPERTIES IN THE PRODUCTION OF PSPS (PLASTIC-SHEATHED PIPES)

The present invention relates to a process for producing insulated pipes, which comprises the steps (A) provision of pipe for a medium and outer pipe, where the pipe for a medium is arranged within the outer pipe and an annular gap having ends E1 and E2 is formed between the pipe for a medium and outer pipe, (B) introduction of a polyurethane system comprising at least one isocyanate component (a) and at least one polyol mixture (b) into the annular gap at the end E1 and (C) foaming and curing of the polyurethane system, wherein the annular gap is closed by means of a cap at the end E2 and this gap has openings having an adjustable size.

The present invention further relates to a cap having openings having an adjustable size, the use of this cap for producing insulated pipes and also an insulated pipe which can be produced by the above-described process of the invention.

Pipes insulated with polyurethane foams are known in the prior art and are described, for example, in EP-A-865 893 and DE-A-197 42 012. Insulated pipe systems are assembled from individual pipe segments. Pipe lengths of 6 m, 12 m and 16 m are normally used for this purpose. Overhang lengths required are specially manufactured or cut to size from existing standard products. The individual pipe segments are welded together and provided with further insulation in the region of the welded seam using existing muff technology. These muff connections have a greater damage potential than the pipe product itself. This difference results from the fact that the pipe lengths are produced under fixed, controlled conditions in production buildings. The muff connections are often produced in situ on the building site under time pressure and exposure to wind and weather. Influences such as temperature, soiling and moisture often influence the quality of the muff connections. Furthermore, the number of muff connections is a large cost factor in the installation of pipe systems.

In the pipe processing industry, it is therefore desirable to install the fewest possible muff connections, based on the length of a line. This is achieved by the use of longer individual pipe segments, but the production of these is more demanding and frequently leads to technical problems.

The major part of individual pipes is produced by means of batch pipe-in-pipe production. In this process, the pipe for a medium, generally made of steel, is provided with star-shaped spacers which serve to center the inner pipe. The pipe for a medium is pushed into the outer pipe, generally of polyethylene, so that an annular gap is produced between the two pipes. This annular gap is filled with polyurethane foam since this has excellent insulation properties. For this purpose, the slightly inclined double pipe is provided with closure caps which are equipped with static venting holes. The liquid reaction mixture is subsequently introduced into the annular gap by means of a polyurethane metering machine and flows in still liquid form downward in the gap between the pipes until the reaction commences. From this point in time onward, further distribution takes place by flow of the foam which has a slow increasing viscosity until the material has reacted completely.

EP 1 552 915 A2 discloses a process for producing insulated pipes, in which a polyurethane system comprising an isocyanate component and a polyol component having a low viscosity of less than 3000 mPas is introduced into the annular gap between the pipe for a medium and the outer pipe. After introduction, the polyurethane system foams and cures at the same time. Amines such as triethylamine or 1,4-diazabicyclo[2.2.2]octane are used as catalysts for polyurethane formation.

EP 1 783 152 A2 likewise discloses a process for producing insulated pipes, in which a polyurethane system comprising an isocyanate component and a polyol component having a particularly low viscosity of less than 1300 mPas is introduced into the annular gap between the pipe for a medium and the outer pipe. This document, too, mentions amines such as triethylamine or 1,4-diazabicyclo[2.2.2]octane as suitable catalysts.

The documents EP 1 552 915 A2 and EP 1 783 152 A2 accordingly describe processes for producing insulated pipes, in which the problem of complete filling of the pipe before foaming and curing is solved by using polyol components having a particularly low viscosity and thus good flowability.

Good alignment of the cells in the polyurethane foam (cell orientation) is responsible for a good compressive strength. The strengths necessary for insulated pipes are generally achieved by means of a corresponding, high density. Such a high density is generally achieved by introducing a large amount of polyurethane foam into the annular gap. The processes from the prior art do not make it possible to achieve good cell orientation in the case of a relatively low density. A high density also has an adverse effect on the thermal conductivity of the polyurethane foam and is therefore to be avoided.

Furthermore, a uniform foam density distribution of the foam is important for the quality of the pipes. However, this is not advantageous when using the processes known from the prior art. Usually, a relatively low foam density is obtained at the ends and a higher foam density is obtained in the middle of the pipe. The longer the pipe, the higher is the required overall density of the foam in the annular gap for production engineering reasons.

Furthermore, controlling the pressure conditions in the interior of the annular gap during introduction of the polyurethane system is problematical in the production of such pipes. If the annular gaps to be filled are provided with caps having static, i.e. not adjustable, openings, the pressure conditions which change during introduction of the polyurethane system cannot be corrected or influenced.

It was an object of the invention to provide a process for producing insulated pipes, which gives pipes which have a low and uniformly distributed core foam density and also small cell diameters of the polyurethane foam obtained and thus a low thermal conductivity. At the same time, it should be possible to obtain corresponding insulated pipes which have a high compressive strength. Likewise, a quick process by means of which high-quality insulated pipes can be produced in a short time should likewise be provided. This process should make it possible to be able to influence the pressure conditions in the annular gap during introduction of the polyurethane system.

These objects are achieved according to the invention by a process for producing insulated pipes, which comprises the steps:

(A) provision of pipe for a medium and outer pipe, where the pipe for a medium is arranged within the outer pipe and an annular gap having ends E1 and E2 is formed between the pipe for a medium and outer pipe, (B) introduction of a polyurethane system comprising at least one isocyanate component (a) and at least one polyol mixture (b) into the annular gap at the end E1 and (C) foaming and curing of the polyurethane system, wherein the annular gap is closed by means of a cap at the end E2 and this cap has openings having an adjustable size.

The process of the invention is carried out batchwise in a preferred embodiment.

The present invention therefore preferably provides the process of the invention which is carried out batchwise.

The individual steps of the process of the invention will be explained in detail below:

Step (A):

Step (A) of the process of the invention comprises provision of pipe for a medium and outer pipe, where the pipe for a medium is arranged within the outer pipe and an annular gap having ends E1 and E2 is formed between the pipe for a medium and outer pipe.

The pipe for a medium, which has a smaller diameter than the outer pipe, is arranged within the outer pipe in such a way that an annular gap is formed between the pipe for a medium and outer pipe. The polyurethane system is introduced into this annular gap in step (B) according to the invention.

The pipe for a medium which is used according to the invention is generally a steel pipe having an outer diameter of, for example, from 1 to 120 cm, preferably from 4 to 110 cm. The length of the pipe for a medium is, for example, from 1 to 24 meters, preferably from 6 to 16 meters. In a preferred embodiment of the process of the invention, a folded spiral-seam tube is used as outer pipe.

The outer pipe used according to the invention can generally comprise any material which appears to be suitable to a person skilled in the art, for example on the basis of a thermoplastic polymer, preferably polyethylene.

The present invention therefore preferably provides the process of the invention in which a pipe based on thermoplastic polymer is used as outer pipe.

The outer pipe generally has a thickness of from 1 to 30 mm. The internal diameter of the outer pipe is generally from 6 to 140 cm, preferably from 10 to 120 cm. The length of the outer pipe is, for example, from 1 to 24 meters, preferably from 6 to 16 meters.

The outer pipe can optionally comprise a plurality of layers which can be combined during the extrusion process for producing the outer pipe. An example is the introduction of multilayer foils between polyurethane foam and outer pipe, with the foil preferably comprising at least one metallic layer to improve the barrier action. Suitable outer pipes of this type are described in EP-A-960 723.

In a particularly preferred embodiment, the insulated pipe produced according to the invention is an insulated composite outer pipe for district heating networks laid in the ground, which meets the requirements of DIN EN 253:2009.

The double pipe comprising pipe for a medium and outer pipe is preferably provided on an inclinable foaming table in step (A) of the process of the invention, so that it can be inclined at an angle of from 0° to 10°, preferably from 0° to 7°.

According to the invention, the polyurethane system is introduced at the end E1 of the pipe into the annular gap between pipe for a medium and outer pipe present there.

In step (A) of the process of the invention, all further facilities, for example for introduction of the polyurethane system, for heating, etc., are preferably attached to the double pipe composed of outer pipe and pipe for a medium. These facilities are known per se to those skilled in the art.

In step (A) of the process of the invention, a pipe for a medium and an outer pipe are provided in such a way that an annular gap having ends E1 and E2 is formed. The ends E1 and E2 are therefore generally annular.

Since the filling of the annular gap is, according to the invention, preferably carried out while the pipe comprising pipe for a medium and outer pipe is inclined, the inclination is preferably such that the end E1 is located at the end of the pipe which is higher than E2. Accordingly, the end E2 is located at the end of the pipe which is preferably lower relative to E1.

According to the invention, the annular gap at the end E2 is closed by means of a cap which has openings having an adjustable size.

In general, the cap by means of which the annular gap is closed at the end E2 can be provided with all types of adjustable openings known to those skilled in the art.

In a preferred embodiment, the cap present at the end E2 is configured so that the size, i.e., the area, of the openings present can be adjusted, preferably from the outside. Adjustment can be carried out either manually of by means of appropriate devices known to those skilled in the art, i.e. motors, gearboxes, etc.

The cap present at the end E2 generally has sufficient openings of an appropriate size, i.e. with an appropriate area, for venting of the annular gap to be possible during the introduction of the polyurethane system in step (B). For example, from 1 to 16 openings, preferably from 4 to 10 openings, for example 8 openings, are present. The openings present can have any shape which appears to be suitable to a person skilled in the art, for example square, rectangular, oval, round, with preference being given to round openings being present. The size, i.e. the area, of the individual openings can, according to the invention, generally be identical or different, with preference being given to openings each having the same area being present.

The total area of all openings present in the cap placed on the end E2 is, according to the invention, dependent on the diameters of pipe for a medium and outer pipe and is preferably a maximum. According to the invention, the total area is, for example, from 1 to 10 000 $cm^2$, preferably from 2 to 5000 $cm^2$, from 2 to 500 $cm^2$, particularly preferably from 4 to 100 $cm^2$. According to the invention, the area of an opening present in the cap placed on the end E2 is, for example, from 0.1 to 1000 $cm^2$, preferably from 0.5 to 100 $cm^2$, particularly preferably from 0.5 to 5 $cm^2$.

In a preferred embodiment of the process of the invention, the size of the openings can be altered by means of a rotatable plate installed in the cap. Furthermore, this rotatable plate preferably slides on the inside over the openings present in the cap so that the size of the openings can be altered by overlapping of the plate.

The present invention therefore preferably provides the process of the invention in which the size of the openings can be altered by means of a rotatable plate installed in the cap.

In the process of the invention, the end E1 can be configured appropriately, for example to be able to ensure that advantageous introduction of the polyurethane system is possible. In a preferred embodiment, the end E1 is likewise closed by means of a cap, particularly preferably a cap which has openings having an adjustable size.

The present invention therefore preferably provides the process of the invention in which the end E1 is also closed by means of a cap which has openings having an adjustable size.

According to the invention, preference is given to an apparatus for introduction of the polyurethane system to be additionally present at the end E1.

Step (B):

Step (B) of the process of the invention comprises introduction of a polyurethane system comprising at least one isocyanate component (a) and at least one polyol mixture (b) into the annular gap at the end E1.

The introduction of the polyurethane system into the annular gap between pipe for a medium and outer pipe as per step (B) is carried out, for example, by means of a polyurethane metering machine known to those skilled in the art.

The liquid reaction mixture, i.e. the polyurethane system according to the invention, flows downward in still liquid form in the annular gap during and after introduction until the polymerization reaction with foam formation commences. From this point in time onward, further distribution takes place by flow of the foam which has a slowly increasing viscosity until the material has reacted completely.

In a preferred embodiment of the process of the invention, the size of the openings in the cap is altered continuously during the introduction as per (B). According to the invention, further preference is given to the openings having their maximum size, i.e. the openings are not covered at all, at the beginning of introduction according to step (B). During introduction, i.e. with increasing degree of fill in the annular gap, the openings are preferably continuously closed.

In a preferred embodiment of the process of the invention, in which the end E1 is also closed by means of a cap which has openings having an adjustable size, the openings of the cap at the end E1 are closed during introduction according to step (B). In a preferred embodiment, the openings in the cap at the end E1 are controlled exactly like the openings of the cap at the end E2 during step (B) of the process of the invention.

In general, any polyurethane system which appears to be suitable to a person skilled in the art can be used in step (B) of the process of the invention. Polyurethane systems which are preferably used are described in detail below.

As isocyanate component (a), use is made of the customary aliphatic, cycloaliphatic and in particular aromatic diisocyanates and/or polyisocyanates. Preference is given to using tolylene diisocyanate (TDI), diphenylmethane diisocyanate (MDI) and in particular mixtures of diphenylmethane diisocyanate and polyphenylenepolymethylene polyisocyanates (crude MDI). The isocyanates can also be modified, for example by incorporation of uretdione, carbamate, isocyanurate, carbodiimide, allophanate and in particular urethane groups.

The isocyanate component (a) can also be used in the form of polyisocyanate prepolymers. These prepolymers are known from the prior art. They are prepared in a manner known per se by reacting polyisocyanates (a) as described above with compounds having hydrogen atoms which are reactive toward isocyanates, preferably polyols, to form polyisocyanate prepolymers, for example at temperatures of about 80° C. The polyol-polyisocyanate ratio is generally selected so that the NCO content of the prepolymer is from 8 to 25% by weight, preferably from 10 to 22% by weight, particularly preferably from 13 to 20% by weight.

According to the invention, particular preference is given to using crude MDI as isocyanate component.

In a preferred embodiment, the isocyanate component (a) is selected so that it has a viscosity of less than 800 mPas, preferably from 100 to 650 mPas, particularly preferably from 120 to 400 mPas, in particular from 180 to 350 mPas, measured in accordance with DIN 53019 at 20° C.

For the purposes of the present invention, the polyurethane systems and polyurethane foams according to the invention are preferably essentially free of isocyanurate groups. The ratio of isocyanurate groups to urethane groups in the foam is preferably less than 1:10, particularly preferably less than 1:100. In particular, essentially no isocyanurate groups are present in the polyurethane foam used according to the invention.

In the polyurethane system used according to the invention, the polyol mixture (b) generally comprises polyols as constituent (b1) and optionally chemical blowing agents as constituent (b2). In general, the polyol mixture (b) comprises physical blowing agents (b3).

The viscosity of the polyol mixture (b) used according to the invention (but without physical blowing agents (b3)) is generally from 200 to 10 000 mPas, preferably from 500 to 9500 mPas, particularly preferably from 1000 to 9000 mPas, very particularly preferably from 2500 to 8500 mPas, in particular from 3100 to 8000 mPas, in each case measured in accordance with DIN 53019 at 20° C. In a particularly preferred embodiment, a polyol mixture (b) (but without physical blowing agents (b3)) which has a viscosity of greater than 3000 mPas, for example from 3100 to 8000 mPas, in each case measured in accordance with DIN 53019 at 20° C., is used in the process of the invention.

The present invention therefore preferably provides the process of the invention in which a polyol mixture (b) (but without physical blowing agents (b3)) which has a viscosity of greater than 3000 mPas, for example from 3100 to 8000 mPas, in each case measured in accordance with DIN 53019 at 20° C., is used.

The polyol mixture (b) generally comprises physical blowing agents (b3). However, the addition of physical blowing agents leads to a significant decrease in the viscosity. An important point to be made in relation to the invention is therefore that the abovementioned figures for the viscosity of the polyol mixture (b) relate, even when the polyol mixture comprises physical blowing agents, to the viscosity of the polyol mixture (b) without addition of physical blowing agents (b3).

Possible polyols (constituent b1) are generally compounds having at least two groups which are reactive toward isocyanate, i.e. at least two hydrogen atoms which are reactive toward isocyanate groups. Examples are compounds having OH groups, SH groups, NH groups and/or $NH_2$ groups.

As polyols (constituent b1), preference is given to using compounds based on polyesterols or polyetherols. The functionality of the polyetherols and/or polyesterols is generally from 1.9 to 8, preferably from 2.4 to 7, particularly preferably from 2.9 to 6.

The polyols (b1) have a hydroxyl number of generally greater than 100 mg KOH/g, preferably greater than 150 mg KOH/g, particularly preferably greater than 200 mg KOH/g. As upper limit to the hydroxyl number, a value of 1000 mg KOH/g, preferably 800 mg KOH/g, in particular 700 mg KOH/g and very particularly preferably 600 mg KOH/g, has generally been found to be appropriate. The abovementioned OH numbers relate to the totality of the polyols (b1), which does not rule out individual constituents of the mixture having higher or lower values.

Component (b1) preferably comprises polyether polyols which have been prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium methoxide or potassium isopropoxide as catalysts with addition of at least one starter molecule comprising from 2 to 8, preferably from 3 to 8, reactive hydrogen atoms in bound form or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used either individually, alternately in succession or as mixtures.

Possible starter molecules are alcohols such as glycerol, trimethylolpropane (TMP), pentaerythritol, sucrose, sorbitol and also amines such as methylamine, ethylamine, isopropylamine, butylamine, benzylamine, aniline, toluidine, toluenediamine, naphthylamine, ethylenediamine (EDA), diethylenetriamine, 4,4'-methylenedianiline, 1,3-propanediamine, 1,6-hexanediamine, ethanolamine, diethanolamine, triethanolamine and the like.

Further compounds which can be used as starter molecules are condensation products of formaldehyde, phenol and diethanolamine or ethanolamine, formaldehyde, alkylphenols and diethanolamine or ethanolamine, formaldehyde, bisphenol A and diethanolamine or erhanolamine, formaldehyde, aniline and diethanolamine or ethanolamine, formaldehyde, cresol and diethanolamine or ethanolamine, formaldehyde, toluidine and diethanolamine or ethanolamine and also formaldehyde, toluenediamine (TDA) and diethanolamine or ethanolamine, and the like.

Preference is given to using glycerol, sucrose, sorbitol and EDA as starter molecule.

The polyol mixture can also optionally comprise chemical blowing agents as constituent (b2). As chemical blowing agents, preference is given to water or carboxylic acids, particularly formic acid. The chemical blowing agent is generally in an amount of from 0.1 to 5% by weight, in particular from 1.0 to 3.0% by weight, based on the weight of the component (b).

As mentioned above, the polyol mixture (b) generally comprises a physical blowing agent (b3). For the purposes of the present invention, physical blowing agents are compounds which are dissolved or emulsified in the starting materials for polyurethane production and vaporize under the conditions of polyurethane formation. Examples are hydrocarbons, for example cyclopentane, halogenated hydrocarbons and other compounds, for example perfluorinated alkanes such as perfluorohexane, chlorofluorocarbons and also ethers, esters, ketones and/or acetals. These are usually used in an amount of from 1 to 30% by weight, preferably from 2 to 25% by weight, particularly preferably from 3 to 20% by weight based on the total weight of the component (b).

The present invention preferably provides the process of the invention in which the polyurethane system is foamed by means of cyclopentane as physical blowing agent.

In a preferred embodiment, the polyol mixture (b) comprises crosslinkers as constituent (b4).

For the purposes of the present invention, crosslinkers are compounds which have a molecular weight of from 60 to <400 g/mol and have at least 3 hydrogen atoms which are reactive toward isocyanates. An example is glycerol.

The crosslinkers (b4) are generally used in an amount of from 1 to 10% by weight, preferably from 2 to 6% by weight, based on the total weight of the polyol mixture (b) (but without physical blowing agents (b3)).

In a further preferred embodiment, the polyol mixture (b) comprises chain extenders which serve to increase the crosslinking density as constituent (b5). For the purposes of the present invention, chain extenders are compounds which have a molecular weight of from 60 to <400 g/mol and have 2 hydrogen atoms which are reactive toward isocyanates. Examples are butanediol, diethylene glycol, dipropylene glycol and ethylene glycol.

The chain extenders (b5) are generally used in an amount of from 2 to 20% by weight, preferably from 4 to 15% by weight, based on the total weight of the polyol mixture (b) (but without physical blowing agents (b3)).

The components (b4) and (b5) can be used either individually or in combination in the polyol mixture.

The polyurethane foams which according to the invention are present as insulating material can be obtained by reaction of the polyurethane system according to the invention.

In the reaction, the polyisocyanates (a) and the polyol mixture (b) are generally reacted in such amounts that the isocyanate index of the foam is from 90 to 240, preferably from 90 to 200, particularly preferably from 95 to 180, very particularly preferably from 95 to 160, in particular from 10 to 149.

In a preferred embodiment, the components (a) and (b) of the polyurethane system are selected so that the resulting foam has a compressive strength (in accordance with EN 253, at a foam density 60 kg/m$^3$) of greater than 0.3 N/mm$^2$, preferably greater than 0.35 N/mm$^2$, particularly preferably greater than 0.4 N/mm$^2$, measured in accordance with DIN 53421.

In general, the total shot foam density in the process of the invention is less than 80 kg/m$^3$, preferably less than 75 kg/m$^3$, particularly preferably less than 70 kg/m$^3$, very particularly preferably less than 65 kg/m$^3$, in particular less than 60 kg/m$^3$. The total shot foam density is generally the total amount of liquid polyurethane material introduced divided by the total volume of the annular gap filled with foam.

The process of the invention can generally be carried out at any compaction which appears to be suitable to a person skilled in the art. For the purposes of the present invention, the compaction is the total fill density of the annular gap divided by the free-foaming core foam density determined in an uncompacted foam body.

The present invention preferably provides the process of the invention in which the reaction is carried out at a compaction of less than 4.0, preferably less than 3.5, particularly preferably less than 3.0 and very particularly preferably less than 2.5.

The polyurethane system used in step (B) of the process of the invention preferably comprises a catalyst. According to the invention, it is generally possible to use all catalysts which appear to be suitable to a person skilled in the art.

Catalysts which are preferably used according to the invention catalyze the blowing reaction, i.e. the reaction of diisocyanate with water. This reaction occurs predominantly before the actual polyurethane chain formation, i.e. the polymerization reaction, and therefore leads to a rapid reaction profile of the polyurethane system.

Examples of catalysts which can be used according to the invention are selected from the group consisting of organic tin compounds such as tin(II) salts of organic carboxylic acids and/or basic amine compounds, preferably tertiary amines such as triethylamine and/or 1,4-diazabicyclo[2.2.2]octane, potassium acetate, potassium format and/or potassium octoate, glycine, N-((2-hydroxy-5-nonylphenyl)methyl)-N-methyl monosodium salt (CAS number 56968-08-2), (2-hydroxypropyl)trimethylammonium 2-ethylhexanoate (CAS number 62314-22-1), 1-propanammonium-2-hydroxy-N,N,N-trimethyl formate, trimethylhydroxypropylammonium formate, 2-((2-dimethylamino)ethyl)methylamino)ethanol (CAS number 2212-32-0) and/or N,N',N''-tris(dimethylaminopropyl)hexahydrotriazine (CAS number 15875-13-5) and mixtures thereof.

The catalysts which are preferred according to the invention can be added to the polyurethane system in any way known to those skilled in the art, for example as such or as solution, for example aqueous solution.

Based on the polyol component (b), at least one catalyst is, according to the invention, added in an amount of from 0.01 to 1.5% by weight, preferably from 0.05 to 1.0% by weight, particularly preferably from 0.05 to 0.5% by weight, very particularly preferably from 0.1 to 0.3% by weight.

Additives (b6) can optionally also be added to the polyurethane system used according to the invention. For the purposes of the present invention, additives (b6) are the auxiliaries and additives which are known and customary in the prior art, but not physical blowing agents. Mention may be made by way of example of surface-active substances, foam stabilizers, cell regulators, fillers, dyes, pigments, flame retardants, antistatics, hydrolysis inhibitors and/or fungistatic and bacteriostatic substances. It should be pointed out that the above-mentioned general and preferred viscosity ranges of the component (b) relate to a polyol mixture (b) including any additives (b6) added (but excluding any physical blowing agent (b3) added).

The present invention therefore preferably provides the process of the invention in which the at least one polyol mixture (b) comprises polyols (b1), optionally chemical blowing agents (b2), physical blowing agents (b3), crosslinkers (b4), chain extenders (b5) and/or optionally additives (b6).

The present invention therefore provides, in particular, the process of the invention in which from 1 to 25% by weight of flame retardant, based on the total weight of the polyol mixture, is used as additive (b6).

Step (C):

Step (C) of the process of the invention comprises foaming and curing of the polyurethane system.

After introduction of the polyurethane system into the annular gap at the end E1, the polymerization reaction to form the polyurethane foam commences. According to the invention, this polymerization reaction can commence even while further polyurethane system is introduced. In a preferred embodiment of the process of the invention, the polymerization reaction commences only when the entire amount of polyurethane system has been introduced.

The foaming and curing generally occurs, according to the invention, at a component temperature from 18 to 35° C., preferably from 20 to 30° C., particularly preferably from 22 to 28° C.

The foaming and curing generally occurs, according to the invention, at surface temperatures of from 15 to 50° C., preferably from 20 to 50° C., particularly preferably from 25 to 45° C.

In step (C) of the process of the invention, the openings in the cap at the end E2 are preferably opened so that blowing agent and/or gaseous materials formed during the reaction under the reaction conditions, can, if necessary, escape.

After step (C) of the process of the invention, an insulated pipe comprising at least a pipe for a medium, an outer pipe and an insulating layer of polyurethane foam between pipe for a medium and outer pipe is obtained.

The insulating layer generally has a thickness of from 1 to 20 cm, preferably from 5 to 20 cm, particularly preferably from 7 to 20 cm.

In a further preferred embodiment, the insulating layer comprising polyurethane foam has a thermal conductivity of less than 27 mW/mK, preferably from 22 to 26.7 mW/mK, measured in accordance with EN ISO 8497.

The present invention also provides for the use of a cap which has openings having an adjustable size for producing insulated pipes.

As regards the individual features and the preferred embodiments, what has been said in respect of the process of the invention applies to the use according to the invention.

The present invention also provides an insulated pipe which can be produced by the process of the invention.

As regards the individual features and the preferred embodiments, what has been said in respect of the process of the invention applies to the insulated pipe of the invention.

Examples of insulated pipes according to the invention, are, for example, district heating pipes or composite wall pipes in accordance with DIN EN 253: 2009.

The insulated pipe of the invention is generally made up of (i) a pipe for a medium, (ii) a layer of polyurethane foam and (iii) an outer pipe.

The present invention also provides a cap which has openings having an adjustable size for covering an annular gap which is formed by a pipe for a medium and an outer pipe, preferably during introduction of a polyurethane system into the annular gap.

What has been said in respect of the process of the invention applies analogously to the cap of the invention. The cap of the invention is preferably used in the process of the invention.

In general, the cap of the invention can be provided with all types of adjustable openings known to those skilled in the art.

In a preferred embodiment, the cap of the invention is configured so that the size, i.e. the area, of the openings present can be adjusted, preferably from outside. Adjustment can be carried out either manually of by means of appropriate devices known to those skilled in the art, i.e. motors, gearboxes, etc.

The cap of the invention generally has sufficient openings of an appropriate size, i.e. with an appropriate area, for venting of the annular gap to be possible during the introduction of the polyurethane system. For example, from 1 to 16 openings, preferably from 4 to 10 openings, for example 8 openings, are present. The openings present can have any shape which appears to be suitable to a person skilled in the art, for example square, rectangular, oval, round, with preference being given to round openings being present. The size, i.e. the area, of the individual openings can, according to the invention, generally be identical or different, with preference being given to openings each having the same area being present.

The total area of all openings present in the cap of the invention is, according to the invention, dependent on the diameters of pipe for a medium and outer pipe forming the annular gap and is preferably a maximum. According to the invention, the total area is, for example, from 1 to 10 000 $cm^2$, preferably from 2 to 5000 $cm^2$, from 2 to 500 $cm^2$, particularly preferably from 4 to 100 $cm^2$. According to the invention, the area of an opening present in the cap of the invention is, for example, from 0.1 to 1000 $cm^2$, preferably from 0.5 to 100 $cm^2$, particularly preferably from 0.5 to 5 $cm^2$.

In a preferred embodiment, the size of the openings can be altered by means of a rotatable plate installed in the cap of the invention. Furthermore, this rotatable plate preferably slides on the inside over the openings present in the cap so that the size of the openings can be altered by overlapping of the plate.

The invention claimed is:

1. A process for producing insulated pipes, which comprises:
    (A) providing a pipe for a medium and an outer pipe, wherein the pipe for a medium is arranged within the outer pipe and an annular gap having ends E1 and E2 is formed between the pipe for a medium and the outer pipe,
    (B) introducing a polyurethane system comprising at least one isocyanate component (a) and at least one polyol mixture (b) into the annular gap at the end E1 and
    (C) foaming and curing of the polyurethane system,
    wherein the annular gap is closed by means of a cap at the end E2 and this cap has openings having an adjustable size, wherein the size of the openings in the cap is altered continuously during said introducing a polyurethane system.

2. The process according to claim 1, wherein the at least one polyol mixture (b) comprises polyols (b1) and at least one of the group consisting of chemical blowing agents (b2), physical blowing agents (b3), crosslinkers (b4), chain extenders (b5), and additives (b6).

3. The process according to claim 1, wherein the size of the openings can be altered by means of a rotatable plate installed in the cap.

4. The process according to claim 1, wherein end E1 is also closed by a cap which has openings having an adjustable size.

5. The process according to claim 4, wherein the openings in the cap at the end E1 are closed during said introducing a polyurethane system.

6. The process according to claim 1, wherein a folded spiral-seam tube is used as said outer pipe.

7. The process according to claim 1, wherein said outer pipe comprises a thermoplastic polymer.

8. The process according to claim 1 which is carried out batchwise.

* * * * *